US011156367B2

(12) United States Patent
Bierbaum et al.

(10) Patent No.: US 11,156,367 B2
(45) Date of Patent: Oct. 26, 2021

(54) OVEN APPLIANCE WITH AN ADJUSTABLE CAMERA ASSEMBLY

(71) Applicant: Haier US Appliance Solutions, Inc., Wilmington, DE (US)

(72) Inventors: Charles Andrew Bierbaum, Louisville, KY (US); Marcelo Torrentes, Louisville, KY (US); Daniel Ian Moore, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 62 days.

(21) Appl. No.: 16/747,867

(22) Filed: Jan. 21, 2020

(65) Prior Publication Data
US 2021/0222884 A1    Jul. 22, 2021

(51) Int. Cl.
*F24C 7/08* (2006.01)
*H04N 5/225* (2006.01)
*F24C 15/16* (2006.01)

(52) U.S. Cl.
CPC ............ *F24C 7/085* (2013.01); *F24C 15/162* (2013.01); *H04N 5/2252* (2013.01); *H04N 5/2257* (2013.01)

(58) Field of Classification Search
None
See application file for complete search history.

(56) References Cited

U.S. PATENT DOCUMENTS

| 6,559,882 | B1 * | 5/2003 | Kerchner | H05B 6/6435 219/506 |
|---|---|---|---|---|
| 8,563,059 | B2 * | 10/2013 | Luckhardt | A47J 37/00 426/233 |
| 9,933,165 | B2 | 4/2018 | Matarazzi et al. | |
| 10,024,544 | B2 | 7/2018 | Bhogal et al. | |
| 2007/0001012 | A1 * | 1/2007 | Kim | H05B 6/6441 235/462.13 |
| 2010/0134620 | A1 * | 6/2010 | Bielstein | H04N 7/188 348/143 |
| 2014/0026762 | A1 * | 1/2014 | Riefenstein | H05B 6/6441 99/325 |
| 2015/0056344 | A1 * | 2/2015 | Luckhardt | F24C 7/081 426/233 |
| 2015/0285513 | A1 * | 10/2015 | Matarazzi | F24C 7/08 99/342 |

(Continued)

FOREIGN PATENT DOCUMENTS

| CN | 108542273 A | 9/2018 |
|---|---|---|
| CN | 108919721 A | 11/2018 |

(Continued)

*Primary Examiner* — William B Perkey
(74) *Attorney, Agent, or Firm* — Dority & Manning, P.A.

(57) ABSTRACT

An adjustable camera assembly mounted within a door of an oven appliance includes a vertical guide rail and a camera movably mounted to the guide rail. A drive mechanism, such as a lead screw driven by a stepper motor, is mechanically coupled to the camera for moving the camera along the guide rail. A controller is coupled to a user interface for obtaining a rack position where food is located. Based on the rack position, the controller determines a viewing position where the camera is placed to achieve a desired view of the food and operates the drive mechanism to position the camera in the viewing position.

20 Claims, 6 Drawing Sheets

(56) References Cited

U.S. PATENT DOCUMENTS

2018/0058702 A1\* 3/2018 Jang .................. F24C 15/322
2019/0285283 A1\* 9/2019 Ebrom ............... F24C 15/322
2020/0236743 A1\* 7/2020 Yang .................. G03B 21/10

FOREIGN PATENT DOCUMENTS

| CN | 209136280 U | 7/2019 |
| EP | 2520169 A1 | 11/2012 |
| EP | 2530387 B1 | 4/2017 |
| ES | 2371665 T3 | 1/2012 |
| KR | 101644711 B1 | 8/2016 |
| WO | WO2012070257 A1 | 5/2012 |

\* cited by examiner

OVEN APPLIANCE WITH AN ADJUSTABLE CAMERA ASSEMBLY

FIELD OF THE INVENTION

The present subject matter relates generally to oven appliances, and more particularly, to door and camera assemblies for oven appliances.

BACKGROUND OF THE INVENTION

Conventional residential and commercial oven appliances generally include a cabinet that includes a cooking chamber for receipt of food items for cooking. Multiple heating elements are positioned within the cooking chamber to provide heat to food items located therein. The heating elements can include, for example, radiant heating elements, such as a bake heating assembly positioned at a bottom of the cooking chamber and/or a separate broiler heating assembly positioned at a top of the cooking chamber.

Notably, it is desirable to provide a camera for generating images of food during a cooking process, e.g., to facilitate monitoring of the cooking progress. However, conventional cameras are positioned at a fixed location within the cabinet or inside the door. While such cameras may provide good visibility of one particular rack location, visibility of food items being cooked at other locations in the cavity may have an impaired view. Alternatively, a fisheye lens could be used on the camera to obtain a wider field of view, but such a lens frequently results in image distortion. For example, if the camera is mounted near a vertical center of the cooking chamber, food being cooked on the bottom rack or the top rack may have minimal visibility or no visibility at all.

Accordingly, an oven appliance that includes an improved camera assembly would be useful. More particularly, an oven appliance with a camera assembly that provides improved visibility at multiple cooking locations would be particularly beneficial.

BRIEF DESCRIPTION OF THE INVENTION

Aspects and advantages of the invention will be set forth in part in the following description, or may be apparent from the description, or may be learned through practice of the invention.

In a first example embodiment, a camera assembly for an oven appliance is provided. The oven appliance includes a cooking chamber and one or more racks positioned within the cooking chamber. The camera assembly includes a guide rail, a camera movably mounted to the guide rail, a drive mechanism mechanically coupled to the camera for moving the camera along the guide rail, and a controller in operative communication with the drive mechanism. The controller is configured for obtaining a rack position where food is located or will be located, determining, based on the rack position, a viewing position where the camera is placed to achieve a desired view of the food, and operating the drive mechanism to position the camera in the viewing position.

In a second example embodiment, a method of operating a camera assembly of an oven appliance is provided. The camera assembly includes a camera slidably mounted to a guide rail and a drive mechanism for selectively moving the camera along the guide rail. The method includes obtaining a rack position where food is located or will be located, determining, based on the rack position, a viewing position where the camera is placed to achieve a desired view of the food, and operating the drive mechanism to position the camera in the viewing position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
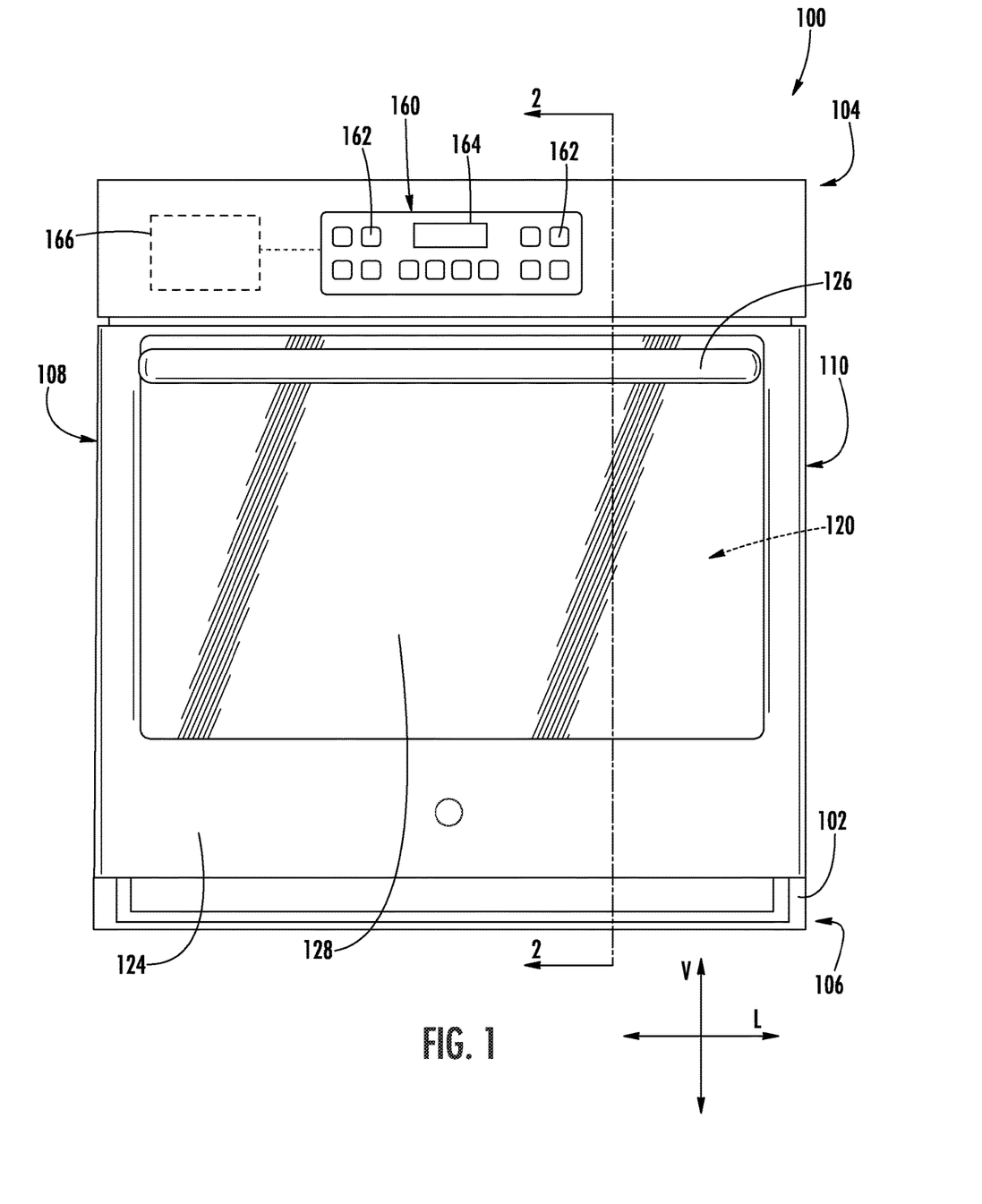
FIG. 1 is a front view of an oven appliance according to an exemplary embodiment of the present subject matter.
Figure 2:
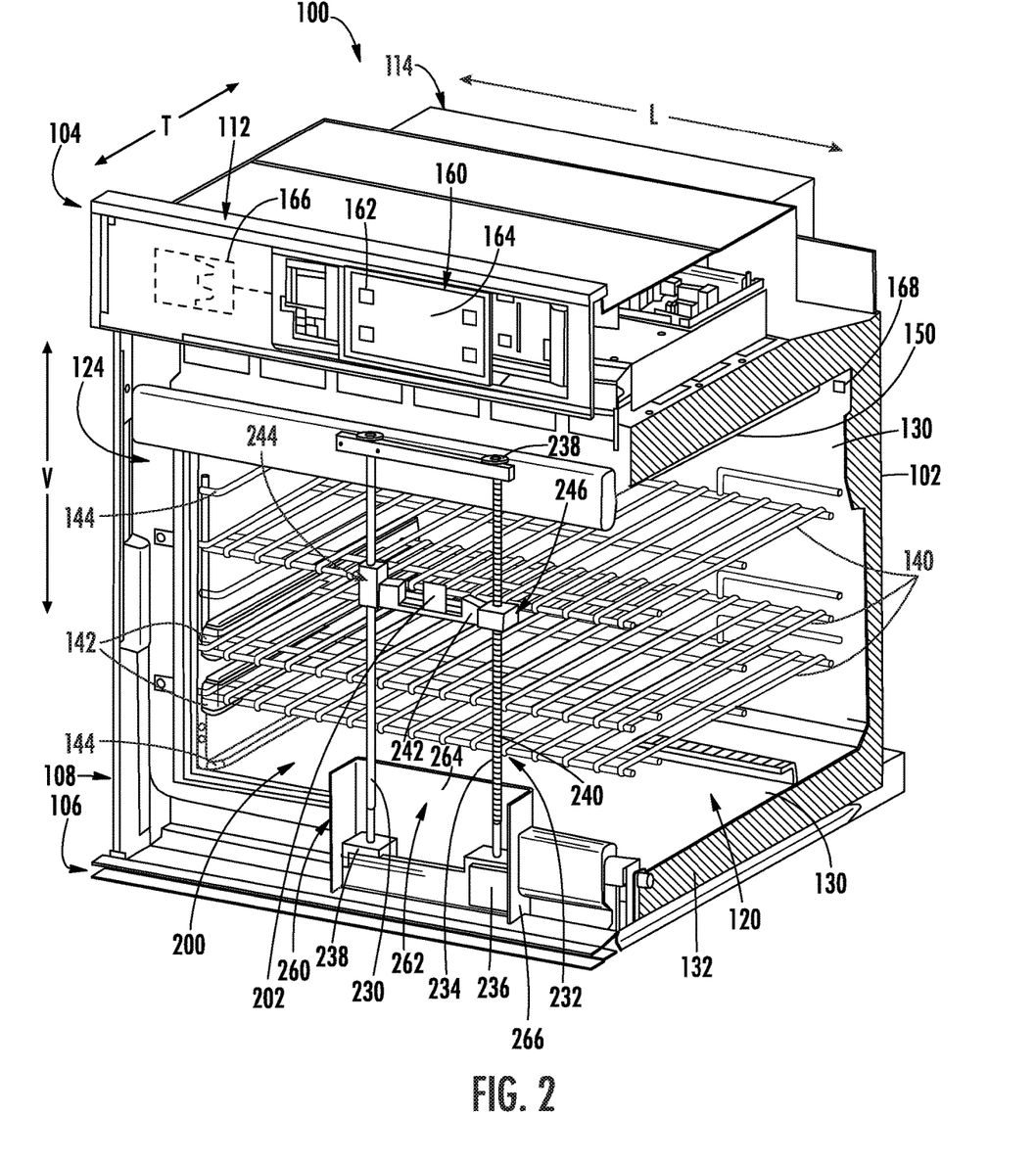
FIG. 2 is a perspective, cross-sectional view of the exemplary oven appliance of FIG. 1, taken along Line 2-2 in FIG. 1.
Figure 3:
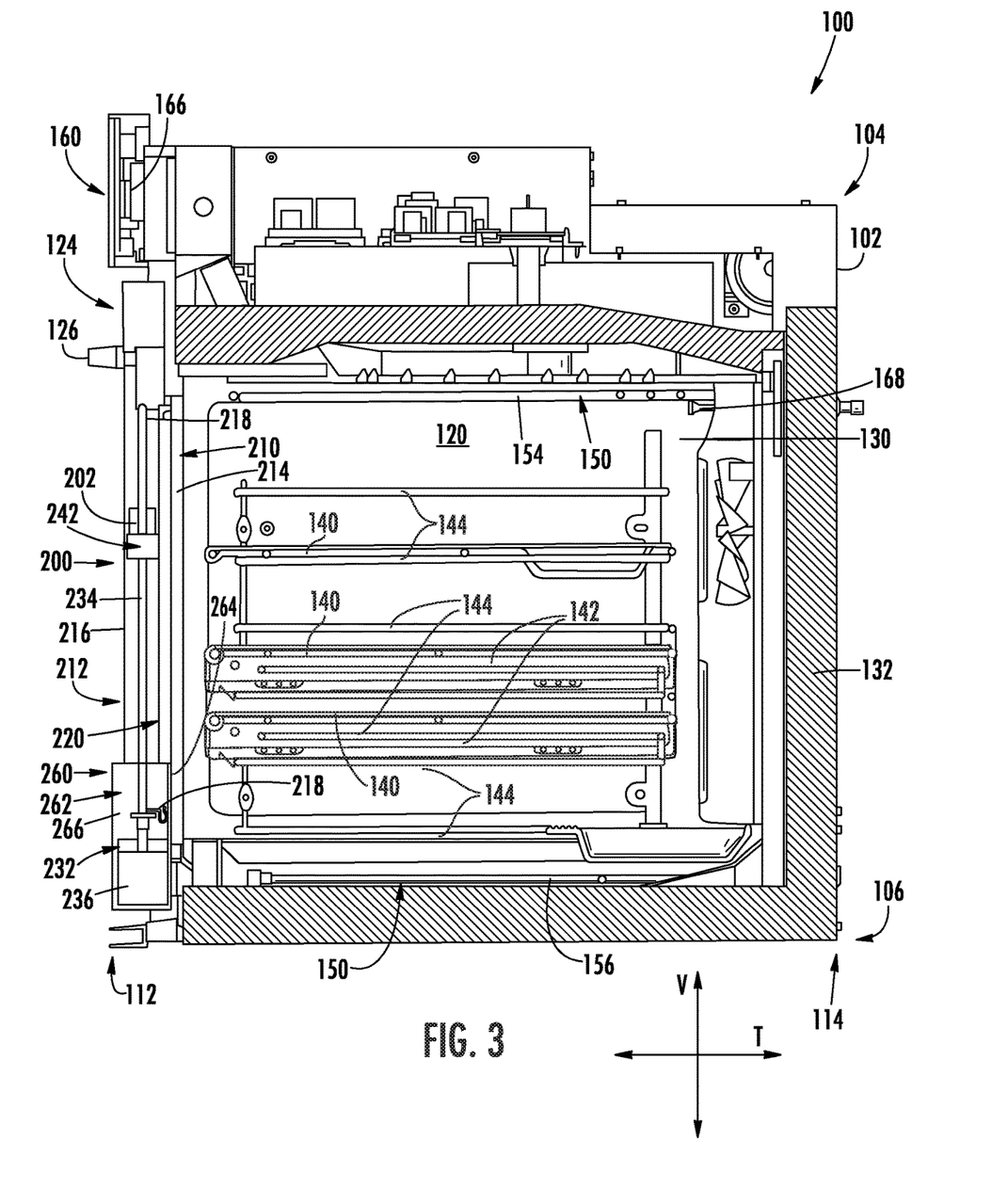
FIG. 3 is a side, cross-sectional view of the exemplary oven appliance of FIG. 1, taken along Line 2-2 in FIG. 1.

FIG. 1 provides a front view of an oven appliance 100 as may be employed with the present subject matter. In addition, FIGS. 2 and 3 provide perspective and side cross-sectional views, respectively, of oven appliance 100. As shown, oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that oven appliance 100 is provided by way of example only, and aspects of the present subject matter may be used in any suitable cooking appliance, such as a gas or electric double oven range appliance. For example, although oven appliance 100 is illustrated as a wall oven installed within a bank of cabinets, it should be appreciated that aspects of the present subject matter may be used in free-standing oven appliances, double ovens, etc. Moreover, aspects of the present subject matter may be used in any other consumer or commercial appliance where it is desirable to use a camera within another suitable appliance. Thus, the example embodiment shown in FIGS. 1 through 3 is not intended to limit the present subject matter to any particular cooking chamber configuration or arrangement.

Oven appliance 100 includes a door 124 rotatably attached to cabinet 102 in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120. According to alternative embodiments, windows 128 may be omitted from door 124 altogether, while cavity visibility may be maintained using a camera system, e.g., as described herein.

In general, cooking chamber 120 is defined by a plurality of chamber walls 130 (FIGS. 2 and 3). Specifically, cooking chamber 120 may be defined by a top wall, a rear wall, a bottom wall, and two sidewalls 130. These chamber walls 130 may be joined together to define an opening through which a user may selectively access cooking chamber 120 by opening door 124. In order to insulate cooking chamber 120, oven appliance 100 includes an insulating gap defined between the chamber walls 130 and cabinet 102. According to an exemplary embodiment, the insulation gap is filled with an insulating material 132, such as insulating foam or fiberglass, for insulating cooking chamber 120.

Referring now to FIG. 3, oven appliance 100 may include a plurality of racks 140 positioned within cooking chamber 120 for receiving food or cooking utensils containing food items. Racks 140 provide support for such food during a cooking process. According to the illustrated embodiment, racks 140 may be slidably mounted within cooking chamber 120 by one or more slide assemblies 142 that are mounted to a sidewall 130 of cooking chamber 120. Alternatively, racks 140 may be slidably received onto embossed ribs or sliding rails such that racks 140 may be conveniently moved into and out of cooking chamber 120.

As best shown in FIG. 3, oven appliance may include six rack supports 144 that are spaced apart along the vertical direction V. In addition, oven appliance 100 is illustrated as including three racks 140 that may each be slidably positioned on each of the six rack supports 128, such that six total rack positions are possible within cooking chamber 120. However, it should be appreciated that according to alternative embodiments, any suitable number of racks mounted in cooking chamber 120 in any suitable manner and being movable between any suitable number of positions is possible and within the scope of the present subject matter.

Oven appliance may further include one or more heating elements (identified generally by reference numeral 150) positioned within cabinet 102 or may otherwise be in thermal communication with cooking chamber 120 for regulating the temperature within cooking chamber 120. For example, heating elements 150 may be electric resistance heating elements, gas burners, microwave heating elements, halogen heating elements, or suitable combinations thereof. According to an exemplary embodiment, oven appliance 100 is a self-cleaning oven. In this regard, heating elements 150 may be configured for heating cooking chamber 120 to a very high temperature (e.g., 800° F. or higher) in order to burn off any food residue or otherwise clean cooking chamber 120.

Specifically, an upper gas or electric heating element 154 (also referred to as a broil heating element or gas burner) may be positioned in cabinet 102, e.g., at a top portion of cooking chamber 120, and a lower gas or electric heating element 156 (also referred to as a bake heating element or gas burner) may be positioned at a bottom portion of cooking chamber 120. Upper heating element 154 and lower heating element 156 may be used independently or simultaneously to heat cooking chamber 120, perform a baking or broil operation, perform a cleaning cycle, etc. The size and heat output of heating elements 154, 156 can be selected based on the, e.g., the size of oven appliance 100 or the desired heat output. Oven appliance 100 may include any other suitable number, type, and configuration of heating elements 150 within cabinet 102. For example, oven appliance 100 may further include electric heating elements, induction heating elements, or any other suitable heat generating device.

A user interface panel 160 is located within convenient reach of a user of the oven appliance 100. For this example embodiment, user interface panel 160 includes user inputs 162 that may generally be configured for regulating heating elements 150 or operation of oven appliance 100. In this manner, user inputs 162 allow the user to activate each heating element 150 and determine the amount of heat input provided by each heating element 150 to a cooking food items within cooking chamber 120. Although shown with user inputs 162, it should be understood that user inputs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user inputs 162. Input/Output ("I/O") signals may be routed between controller 166 and various operational components of oven appliance 100 such that operation of oven appliance 100 can be regulated by controller 166. In addition, controller 166 may also be communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chamber 120, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Referring now to FIGS. 2 through 5, door 124 and a camera assembly 200 will be described in more detail according to exemplary embodiments of the present subject matter. More specifically, according to exemplary embodiments, oven appliance 100 may include a camera assembly 200 which is positioned within door 124 and is generally configured for providing images of food items that are cooking within cooking chamber 120. In this regard, for example, camera assembly 200 includes a camera 202 that is configured for taking still images or video and transmitting those images to a user to provide feedback regarding the cooking process. For example, camera 202 can provide a live image or video to display 164 (FIG. 1) upon user request. According to still other embodiments, camera 202 may be a thermal imaging device or any other device for providing the user with feedback regarding the food items being cooked within cooking chamber 120.

Notably, as explained above, installing a camera in a fixed location within an oven appliance may provide visibility of only a single cooking location. For example, as explained above, oven appliance 100 may include three racks 140 that are positionable in six rack positions (i.e., supported by six corresponding rack supports 144). According to still other embodiments, any suitable number of racks may be positionable in any suitable number of positions, each of which may have a preferable or optimal viewing angle for obtaining ideal images or video of a food item being cooked in that particular location. Therefore, aspects of the present subject matter are directed to features of door 124, controller 166, and camera assembly 200 that facilitate movement of camera 202 for improved viewing angle and high quality images.

As best shown in FIG. 3, door 124 generally includes an inner door panel 210 positioned proximate cooking chamber 120 and an outer door panel 212 positioned proximate an ambient environment (e.g., outside of oven appliance 100). In general, each of inner door panel 210 and outer door panel 212 may include one or more transparent windows (such as window 128). Although these windows are referred to herein as glass panes, it should be appreciated that these transparent windows may be constructed of any suitably rigid and temperature resistant material, e.g., such as acrylic glass or Plexiglass. However, according to alternative embodiments, inner door panel 210 and/or outer door panel 212 may be solid or constructed from any other suitable material.

Specifically, according to the illustrated embodiment, inner door panel 210 includes an inner glass pane 214 (which is closest to or faces cooking chamber 120) and outer door panel 212 includes an outer glass pane 216. A spacer bracket 218 is positioned between inner glass pane 214 and outer glass pane 216 to maintain a gap between the two glass panes. Specifically, inner glass pane 214 and outer glass pane 216 are separated by an air gap 220 along the transverse direction T (e.g., when door 124 is closed). In general, air gap 220 defines helps insulate cooking chamber 120. Although inner door panel 210 and outer door panel 212 are illustrated herein as having single glass panes, it should be appreciated that each assembly may include multiple glass panes or any other suitable construction according to alternative embodiments. For example, door panels 210, 212 may include any suitable number of transparent windows formed from any suitable material may be used according to alternative embodiments.

As shown in FIGS. 2 through 5, camera assembly 200 generally includes one or more guide rails 230 that are generally configured for facilitating movement of camera 202 and proper alignment of camera 202 relative to cooking chamber 120 and food items located therein. According to the illustrated embodiments, guide rails 230 are circular steel rods that extend substantially along the vertical direction V between a bottom 106 and a top 104 of cabinet 102. It should be appreciated that as used herein, terms of approximation, such as "approximately," "substantially," or "about," refer to being within a ten percent margin of error.

Although camera assembly 200 is described herein is being configured for moving camera 202 along the vertical direction V, it should be appreciated that according to alternative embodiments, aspects of the present subject matter may facilitate movement along the horizontal direction or any other suitable angle and/or direction. In addition, according to the illustrated embodiment, camera assembly 200 is positioned within the door 124, e.g., between inner door panel 210 and outer door panel 212. However, it should be appreciated that according to alternative embodiments, camera assembly 200 may be positioned elsewhere within cabinet 102, such as along a sidewall 130 of cooking chamber 120.

According to exemplary embodiments, camera assembly 200 may include any suitable number of guide rails 230 positioned in any suitable manner and having any suitable size or geometry. For example, the embodiment illustrated in FIGS. 2 through 4 includes a single guide rail 230, while the embodiment illustrated in FIG. 5 includes two guide rails 230 spaced apart along a lateral direction L. Although guide rails 230 are illustrated herein is being circular metal rods, it should be appreciated that according to alternative embodiments, guide rails 230 may be square, rectangular, or any other suitable shape. In addition, guide rails 230 may include any other suitable features for facilitating smooth movement of camera 202, such as a geared track for facilitating a geared timing arrangement with camera 202.

Figure 4:
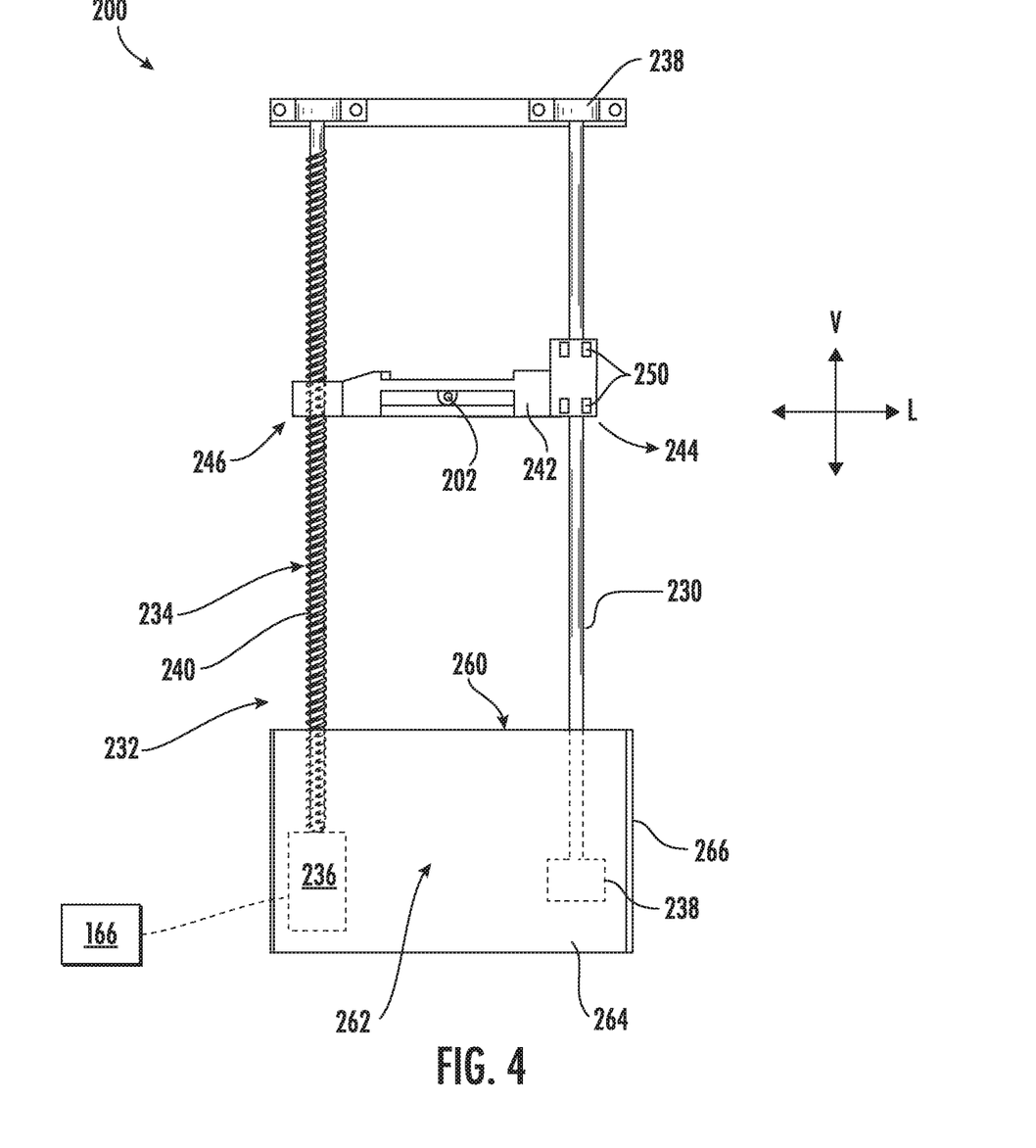
FIG. 4 is a rear view of a camera assembly (from within the cooking chamber) that may be used within a door of the exemplary oven appliance of FIG. 1 according to an exemplary embodiment of the present subject matter.

Referring now specifically to the embodiment illustrated in FIGS. 2 through 4, camera 202 may be movably mounted to guide rail 230 and camera assembly 200 may further include a drive mechanism 232 that is mechanically coupled to camera 202 for moving camera 202 along guide rail 230. More specifically, drive mechanism 232 may include a lead screw 234 that is mechanically coupled to camera 202 and a drive motor 236 that is mechanically coupled to lead screw 234 for rotating lead screw 234 to move camera 202 along guide rail 230. According to the illustrated embodiment, lead screw 234 extends parallel to guide rail 230 to facilitate vertical movement of camera 202 without binding. As shown, guide rails 230 and/or lead screw 234 may be mounted and supported by one or more pillow block bearings, bushings, or other suitable mounting structures 238, e.g., at a top and bottom of their respective lengths.

As shown, lead screw 234 may be an elongated threaded shaft with screw threads 240 that are configured for engaging complementary threads (not shown) defined within a camera housing 242. In this regard, according to the illustrated embodiment, camera 202 may be mounted to guide rails 230 and lead screw 234 using camera housing 242, which may be formed using any suitable material and which extends along the lateral direction L for mechanically engaging lead screw 234 and slidably mounting to guide rail 230. Specifically, camera housing 242 defines a first end 244 and a second end 246 spaced apart along the lateral direction L. Guide rail 230 slidably couples to first end 244 and lead screw 234 mechanically engages second end 246.

Camera housing 242 may generally define any suitable features or geometries for receiving camera 202 and for engaging guide rails 230 and/or lead screw 234. In this regard, for example, camera assembly may define one or more bushings 250 for providing a low friction interface between camera housing 242 and guide rail 230. Specifically, according to the illustrated embodiment, camera housing defines two bushings 250 spaced vertically within first end 244 of camera housing 242 for facilitating proper alignment and smooth sliding of camera housing 242. In addition, as mentioned above, second end 246 of camera housing 242 may define complementary threads for engaging screw threads 240 of lead screw 234.

As used herein, "motor" may refer to any suitable drive motor and/or transmission assembly for rotating lead screw 234 or otherwise moving camera 202 along guide rail 230. For example, drive motor 236 may be a brushless DC electric motor, a stepper motor, or any other suitable type or configuration of motor. For example, drive motor 236 may be an AC motor, an induction motor, a permanent magnet synchronous motor, or any other suitable type of AC motor. In addition, drive motor 236 may include any suitable transmission assemblies, clutch mechanisms, or other components. According to exemplary embodiments, controller 166 may be in operative communication with drive motor 236 for regulating operation of drive motor 236 and movement of camera 202.

The embodiment of camera assembly 200 illustrated in FIGS. 2 through 4 includes a drive mechanism 232 having a lead screw 234 that rotates to move camera 202 up or down along the vertical direction V. However, it should be appreciated that according to alternative embodiments, any other suitable drive mechanism may be used while remaining within the scope of the present subject matter. For example, referring briefly to FIG. 5, another exemplary embodiment of camera assembly 200 will be described. Due to the similarity between the embodiments described herein, like reference numerals may be used to refer to the same or similar features.

Figure 5:
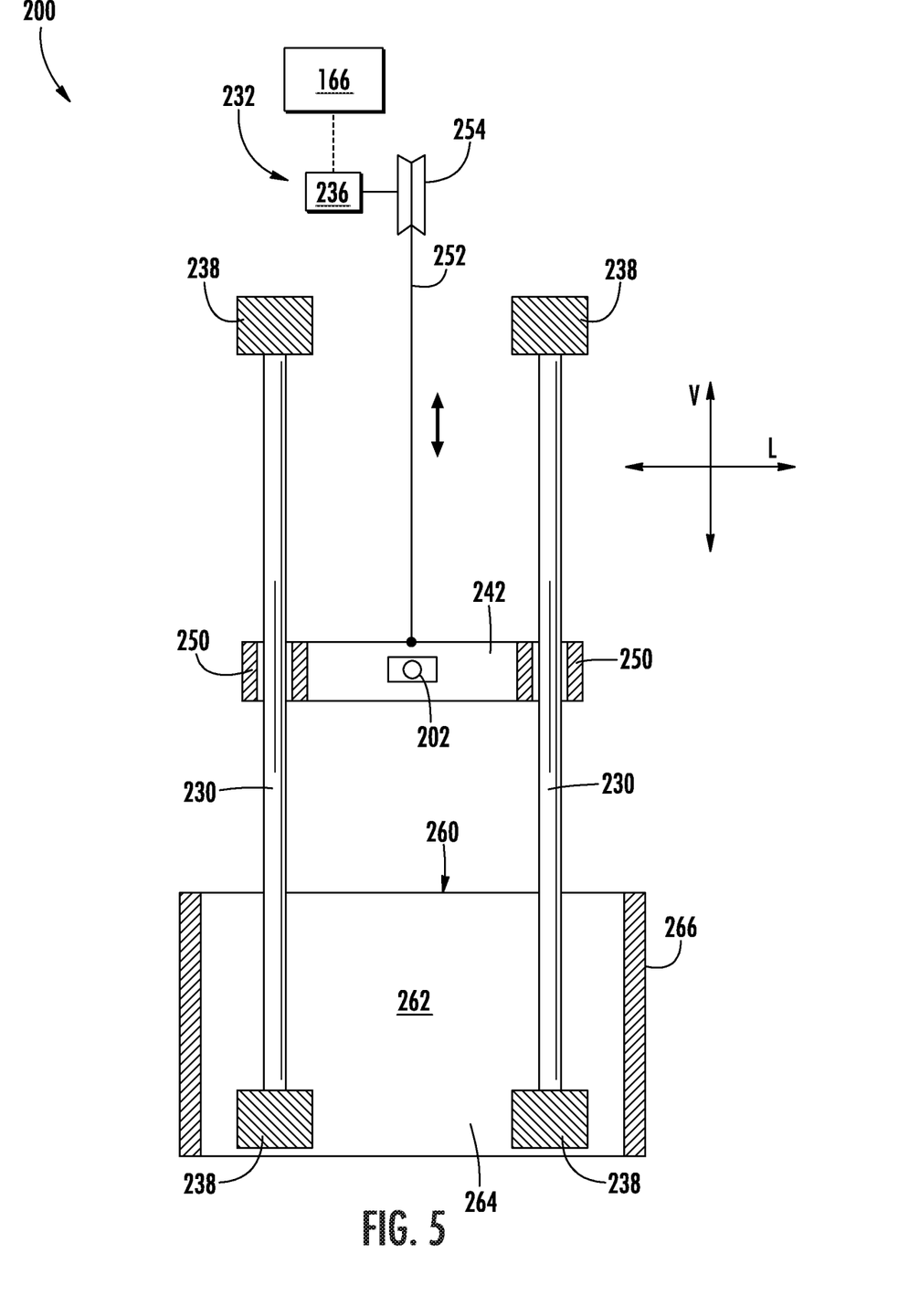
FIG. 5 is a front view of a camera assembly (from outside the cooking chamber) that may be used within a door of the exemplary oven appliance of FIG. 1 according to another exemplary embodiment of the present subject matter.

As shown in FIG. 5, camera housing 242 is mounted on two parallel guide rails 230 that are positioned within the air gap 220 of door 124. Camera housing 242, and thus camera 202, may slide freely along the vertical direction V. According to this exemplary embodiment, drive mechanism 232 includes a guide wire 252 that is mechanically coupled or attached to camera 202 or camera housing 242. In addition, drive motor 236 may be configured for rotating a pulley 254 that winds and unwinds guide wire 252 to lift or lower camera housing 242. Thus, according to this exemplary embodiment, drive motor 236 and pulley 254 are mounted at a top of door 124. It should be further appreciated that other drive mechanisms are possible and within the scope of the present subject matter, such as belt driven systems, chain driven systems, bolt driven systems, etc.

Therefore, according to exemplary aspects of the present subject matter, controller 166 may be configured for operating drive motor 236 to selectively position camera housing 242 and camera 202 at any suitable vertical location within door 124 for taking photos or video of a particular rack location or food item positioned within cooking chamber 120. In addition, according to exemplary embodiments, camera assembly 200 or camera housing 242 may further include features for moving camera 202 along a lateral direction L, for angling camera 202 relative to a horizontal plane or the transverse direction T, or for regulating the position or operation of camera 202 any other suitable manner.

Referring still to FIGS. 2 through 5, camera assembly 200 may further include a heat shield 260 that extends around the one or more guide rails 230 and defines a protective cavity 262 that is configured for receiving camera 202 and providing a thermal break from the heat and/or heating elements 150 within cooking chamber 120. In this regard, according to the illustrated embodiment, heat shield 260 is formed from metal and may include one or more insulating structures, materials, or other layers to limit the exposure of sensitive electronic components of camera 202 from the high heat and thermal energy within cooking chamber 120.

According to the illustrated embodiment, heat shield 260 is positioned proximate a bottom of door 124 within air gap 220. As shown, camera housing 242 may slide entirely within protective cavity 262. Specifically, as illustrated, heat shield 260 may be U-shaped and may include a front plate 264 positioned proximate inner door panel 210 and two side plates 266 that extend from the front plate 264 and inner door panel 210 toward outer panel 212 for substantially enclosing protective cavity 262. It should be appreciated that according to alternative embodiments, heat shield 260 may be constructed from any other suitable material and may have any other suitable size, geometry, and cooling features.

According to exemplary embodiments, controller 166 may be programmed for protecting camera 202 during high temperature operation of oven appliance 100. Specifically, for example, high-temperature operation may refer to broil cycles, cooking cycles that operate above is particular temperature threshold, such as 500° F. or 600° F., or a self-cleaning cycle when cooking chamber 120 may reach temperatures of 800° F. or greater. Thus, when a user initiates such a high temperature operating cycle using user interface panel 160, controller 166 may move camera 202 into protective cavity 262 to prevent damage. Alternatively, controller 166 may monitor the chamber temperature, e.g., using temperature sensor 168, and may move camera 202 into protective cavity 262 when the chamber temperature exceeds a predetermined temperature threshold, such as about 400° F., about 500° F., about 600° F., about 700° F., about 800° F., or greater.

Now that the construction of oven appliance 100 and camera assembly 200 have been described according to exemplary embodiments, an exemplary method 300 of imaging or monitoring food items within an oven appliance using a camera assembly will be described. Although the discussion below refers to the exemplary method 300 of operating camera assembly 200 of oven appliance 100, one skilled in the art will appreciate that the exemplary method 300 is applicable to the operation of a variety of other appliances and/or camera systems.

Figure 6:
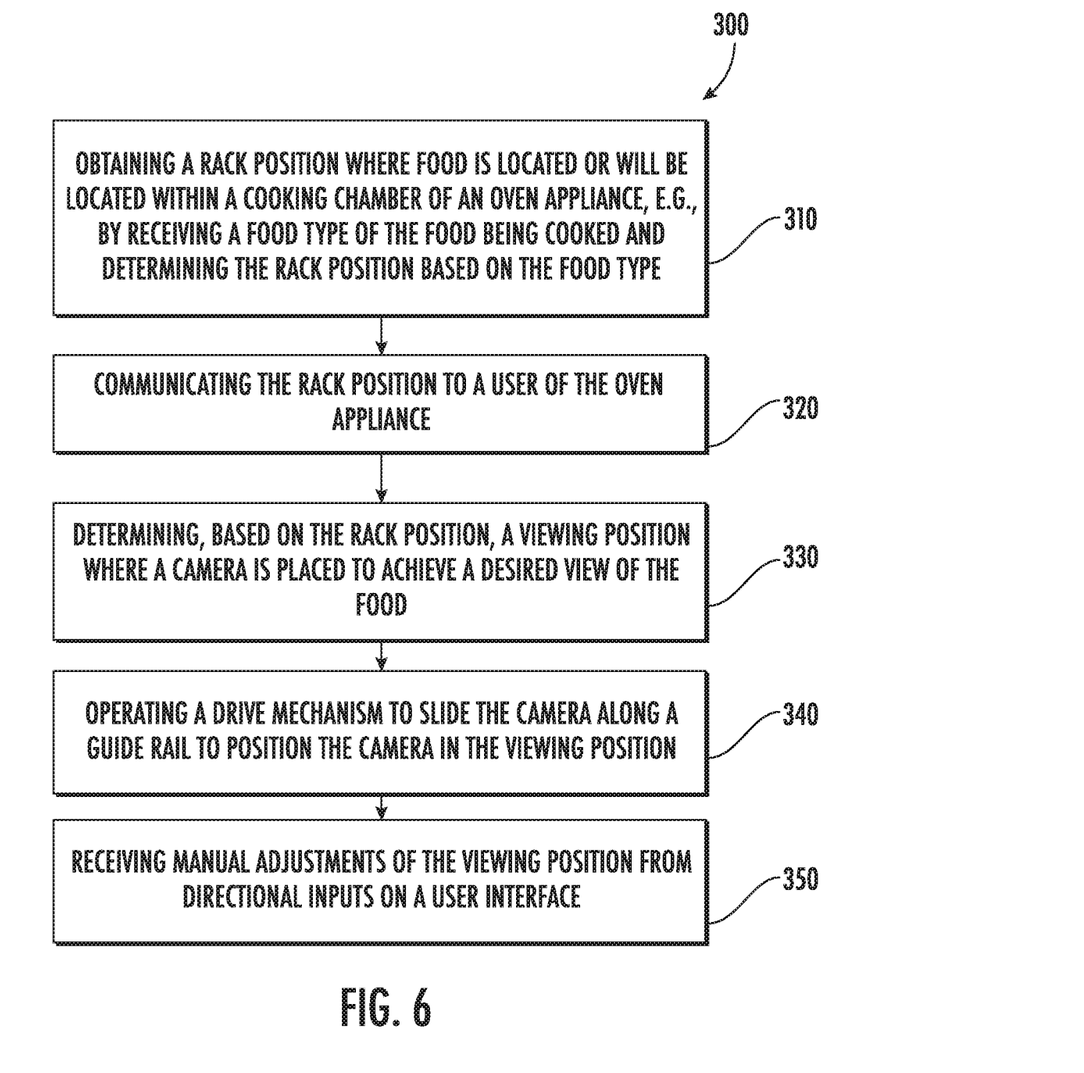
FIG. 6 provides a method of operating a camera assembly of an oven appliance according to an exemplary embodiment of the present subject matter.

Referring now to FIG. 6, method 300 includes, at step 310, obtaining a rack position where food is located or will be located within a cooking chamber of an oven appliance. For example, continuing example from above, the rack position may include any suitable data indicative of the location of food or cooking utensils holding food within cooking chamber 120. In this regard, according to the illustrated embodiment, the rack position may be of value between #1 and #6, where rack position #1 refers to food positioned on the top rack support 144 (e.g., closest to upper gas heating element 154) and rack position #6 refers to food positioned on bottom rack support 144 (e.g., closest to lower gas heating element 156). Alternatively, the rack position may be indicated simply as an "upper," "middle," or "lower" rack position, or may refer to a specific height (e.g., in inches) of food items, e.g., relative to bottom 106 of cooking chamber 120.

Although the exemplary embodiments described herein referred to rack position simply by the vertical location within cooking chamber 120, it should be appreciated that according to alternative embodiments any other suitable positional data related to food items within cooking chamber 120 may be used for improved imaging. For example, according to alternative embodiments, the rack position may include not only the vertical location of food, but also the position of a food item along the lateral direction L or transverse direction T on a particular rack 140. It should be appreciated that aspects of the present subject matter may include adjusting camera assembly 200 for precisely monitoring and providing images of food positioned at any suitable location within cooking chamber 120.

Notably, the rack position may be determined by controller 166 in any suitable manner based on any suitable user input or control algorithm. For example, according to an exemplary embodiment, obtaining the rack position comprises receiving a food type of the food being cooked and determining the rack position based on the food type. In this regard, for example, a user may select a precision cooking or automated cooking mode using user interface panel 160. When such an automated cooking mode is entered, user interface panel 160 may prompt the user with a series of questions and the answers to those questions (e.g., as input via user interface panel) may dictate the proper rack position. Specifically, for example, if a user selects salmon as the food being cooked, controller 166 may be programmed to instruct the user via user interface panel 160 to position the salmon in a shallow roasting pan on a lower rack position (e.g., rack position #2). Thus, the rack position is communicated to the user at step 320 so that the food items may be appropriately positioned in the desired or optimal rack position.

According to alternative embodiments, user interface panel 160 may provide one or more input buttons (e.g. user inputs 162) for allowing a user to manually interact with camera assembly 200, e.g., by setting or selecting the rack position and/or manually adjusting the rack position or viewing position. In this regard, for example, obtaining the rack position may include displaying a query regarding the rack position on the user interface panel and receiving a user input regarding the rack position in response to the query. Thus, for example, a user may start a cooking cycle by selecting a bake operation at 400° F., after which user interface panel 160 may ask where food items are located, e.g., by providing display buttons for selecting racks #1 through #6. Once selected, controller 166 may commence the cooking cycle assuming food items are positioned at the selected rack position.

Method 300 further includes, at step 330, determining, based on the rack position, a viewing position where a camera is placed to achieve a desired view of the food. In this regard, for example, controller 166 may be programmed for determining an optimal or improved viewing angle for any suitable rack position. Step 340 may include operating a drive mechanism to slide the camera along the guide rail to position the camera in the viewing position. Specifically, continuing the example from above, drive mechanism 232 may move camera 202 along guide rails 230 to the desired viewing position.

It should be appreciated that the viewing position may be dependent on a variety of parameters in addition to the vertical height within cooking chamber and that controller 166 may be programmed for adjusting the viewing position to compensate for such parameters. For example, the proper viewing position may be dependent upon the type of cooking utensil used, the type of food being cooked, or based on user preference regarding viewing angles. According to an exemplary embodiment, the viewing position of the camera is above the rack position along the vertical direction V and angled slightly downward (e.g., between about 10° and 45° relative to the transverse direction T). In addition, according to the illustrated embodiment, camera 202 may be positioned at a fixed angle within camera housing 242. However, according to alternative embodiments, camera assembly 200 may include a pivoting mechanism for adjusting an angle of camera 202 relative to the camera housing 242, e.g., for improving the viewing position or angle of view to the food items being cooked.

Although the exemplary method described herein refers to positioning camera assembly 200 in one of six discrete viewing positions, it should be appreciated that variations and modifications to the camera movement may be used while remaining within the scope of the present subject matter. For example, method 300 may further include, at step 350 receiving manual adjustments of the viewing position from directional inputs on a user interface panel. In this regard, for example, after the viewing position has been set and the food is positioned at the desired rack position, a user may wish to manually adjust the angle of view of camera 202. Thus, during an operating cycle, user interface panel 160 may display a plurality of directional inputs, such as inputs for adjusting the vertical or lateral position of camera 202. In addition, directional inputs may be used for adjusting the zoom or focus of camera 202, the angular position of camera relative to the transverse direction T, etc. Other variations and modifications as to viewing positions, rack positions, and the operation of camera assembly 200 may be used while remaining within the scope of the present subject matter.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using oven appliance 100 and camera assembly 200 as an example, it should be appreciated that these methods may be applied to the operation of any oven appliance or camera system having any other suitable configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A camera assembly for an oven appliance, the oven appliance comprising a cooking chamber and one or more racks positioned within the cooking chamber, the camera assembly comprising:
   a guide rail;
   a camera movably mounted to the guide rail;
   a drive mechanism mechanically coupled to the camera for moving the camera along the guide rail; and
   a controller in operative communication with the drive mechanism, the controller being configured for:
      obtaining a rack position where food is located or will be located;
      determining, based on the rack position, a viewing position where the camera is placed to achieve a desired view of the food; and
      operating the drive mechanism to position the camera in the viewing position.

2. The camera assembly of claim 1, wherein obtaining the rack position comprises:
   receiving a food type of the food being cooked; and
   determining the rack position based on the food type.

3. The camera assembly of claim 2, wherein the controller is further configured for:
   communicating the rack position to a user of the oven appliance.

4. The camera assembly of claim 1, wherein the oven appliance further comprises:
   a user interface for receiving user inputs and communicating rack positions to a user of the oven appliance.

5. The camera assembly of claim 4, wherein obtaining the rack position comprises:
   displaying a query regarding the rack position on the user interface; and
   receiving a user input regarding the rack position in response to the query.

6. The camera assembly of claim 4, wherein the user interface comprises input buttons for selecting the rack position.

7. The camera assembly of claim 4, wherein the user interface comprises directional inputs for facilitating manual adjustment of the viewing position of the camera.

8. The camera assembly of claim 1, wherein the controller is configured for moving the camera to a plurality of discrete viewing positions.

9. The camera assembly of claim 1, wherein the plurality of discrete viewing positions comprises six viewing positions spaced apart along a vertical direction.

10. The camera assembly of claim 1, wherein the viewing position of the camera is above the rack position along the vertical direction.

11. The camera assembly of claim 1, wherein the camera is positioned at a fixed angle relative to a transverse direction.

12. The camera assembly of claim 1, wherein the oven appliance comprises a door rotatably mounted to a cabinet for providing selective access to the cooking chamber, the door comprising:
    an inner door panel; and
    an outer door panel spaced apart from the inner door panel by an air gap, the camera assembly being positioned within the air gap.

13. The camera assembly of claim 1, wherein the drive mechanism comprises:
    a lead screw mechanically coupled to the camera and extending substantially parallel to the guide rail; and
    a drive motor for rotating the lead screw to move the camera along the guide rail.

14. The camera assembly of claim 13, further comprising:
    a camera housing extending between a first end and a second end along the lateral direction, wherein the guide rail is slidably coupled to the first end and the lead screw is operably coupled to the second end.

15. A method of operating a camera assembly of an oven appliance, the camera assembly comprising a camera slidably mounted to a guide rail and a drive mechanism for selectively moving the camera along the guide rail, the method comprising:
    obtaining a rack position where food is located or will be located;
    determining, based on the rack position, a viewing position where the camera is placed to achieve a desired view of the food; and
    operating the drive mechanism to position the camera in the viewing position.

16. The method of claim 15, wherein obtaining the rack position comprises:
    receiving a food type of the food being cooked; and
    determining the rack position based on the food type.

17. The method of claim 16, further comprising:
    communicating the rack position to a user of the oven appliance.

18. The method of claim 15, wherein obtaining the rack position comprises:
    displaying a query regarding the rack position on a user interface; and
    receiving a user input regarding the rack position in response to the query.

19. The method of claim 15, further comprising:
    receiving the rack position from input buttons positioned on a user interface.

20. The method of claim 15, further comprising:
    receiving manual adjustments of the viewing position from directional inputs on a user interface.

* * * * *